United States Patent Office

3,296,312
Patented Jan. 3, 1967

---

3,296,312
CATALYTIC CONVERSION
Paul A. Naro, Woodbury, David D. Neiswender, Haddonfield, and Robert D. Offenhauer, Sewell, N.J., assignors to Mobil Oil Corporation, a corporation of New York
No Drawing. Filed June 13, 1963, Ser. No. 287,495
9 Claims. (Cl. 260—614)

This invention relates to catalytic conversion and, more particularly, to catalytic conversion involving the use of crystalline aluminosilicate catalysts.

Zeolitic materials, both natural and synthetic, in naturally occurring and modified forms, have been demonstrated in the past to have catalytic capabilities for various types of hydrocarbon conversion. Such zeolitic materials are ordered crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

The present invention involves the use of such crystalline aluminosilicate catalysts for hydride-transfer reactions. In a particular application of the present invention, a variety of aldehydes are disproportionated by means of crystalline aluminosilicate catalysts to provide an extremely satisfactory mechanism for producing a variety of reaction products.

It is accordingly a primary object of the present invention to provide a novel hydride-transfer process involving the use of crystalline aluminosilicate catalysts.

It is another important object of the present invention to provide a novel oxidation-reduction process involving the use of crystalline aluminosilicate catalysts which is particularly applicable to Cannizzaro-Tishchenko-type disproportionation reactions.

It is a further important object of the present invention to provide a novel process for converting aldehydes to a variety of reaction products involving the use of crystalline aluminosilicate catalysts.

It is a further object of the present invention to provide a novel process for a one-step conversion of formaldehyde to dimethyl ether involving the use of crystalline aluminosilicate catalysts.

It is still another object of the present invention to provide a novel technique for the conversion of benzaldehyde to benzene, toluene and other reaction products involving the use of crystalline aluminosilicate catalysts.

These and other objects and advantages of the present invention will become more apparent upon reference to the ensuing description and appended claims.

In its broader aspects, the present invention involves the use of crystalline aluminosilicate catalysts for the purpose of catalyzing hydride-transfer reactions. The hydride-transfer reaction, which is described in great detail in an article by N. C. Deno et al. on pages 7–12 of "Chemical Reviews," February 1960 (which is hereby incorporated by reference), essentially involves the transfer of a hydrogen atom with its pair of electrons from one carbon atom to another. The transfer of a hydride ion results in oxidation-reduction, with a first molecule serving as the hydride donor and a second molecule as a hydride acceptor.

A particular type of hydride-transfer reaction to which the present invention is particularly applicable is the Cannizzaro reaction, which essentially involves the disproportionation of aldehydes having no hydrogen atoms on any carbon atom which is alpha to the carbonyl carbon of the aldehyde. This reaction may be broadly illustrated, for example, by the disproportionation of formaldehyde, as follows:

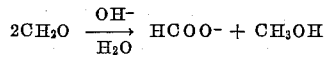

A closely related reaction, the Tishchenko reaction, may be also represented using formaldehyde as an exemplary starting material:

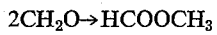

In accordance with the present invention, it has been discovered that hydride-transfer reactions in general, and particularly Cannizzaro and Tishchenko-type reactions, can be effectively catalyzed utilizing crystalline aluminosilicate materials as catalysts under suitable reaction conditions. Indeed, such catalytic materials not only effectively catalyze the hydride-transfer reactions in question but, in certain cases, provide a mechanism by which desired reaction products may be obtained directly from a starting material which was previously thought to be incapable of being directly converted to such product.

A suitable example of the practice of the present invention may be found in the conversion of formaldehyde directly into dimethyl ether. As is described more particularly in Example 1 below, when formaldehyde is passed into contact with a crystalline aluminosilicate catalyst under suitable reaction conditions, a significant quantity of dimethyl ether is present in the product stream. The reaction which takes place may be illustrated as follows:

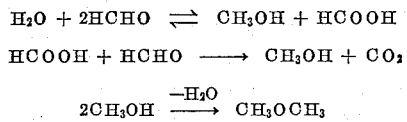

As shown above, the first reaction which may be said to take place involves the disproportionation of the formaldehyde to form methanol and formic acid. The methanol is dehydrated under the conditions of the reaction to form dimethyl ether. The formic acid, on the other hand, reacts with additional formaldehyde in a hydride-transfer reaction to form additional methanol which, in turn, is dehydrated to form still more dimethyl ether. Thus, a combination of hydride-transfer reactions and dehydrations are carried out to form the desired dimethyl ether.

The aluminosilicates usable as catalysts in accordance with the present invention include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$, is equal to unity. One cation may be exchanged either in entirety or partially by another cation utilizing ion exchange techniques as discussed hereinbelow. By means of such cation exchange, it is possible to vary the size of the pores in the given aluminosilicate by suitable selection of the particular cation. The spaces between the tetrahedra are occupied by molecules of water prior to dehydration.

A description of zeolites of the type usable in the present invention is found in Patent 2,971,824, whose disclosure is hereby incorporated herein by reference. These aluminosilicates have well-defined intra-crystalline dimensions such that only reactant or product molecules of suitable size and shape may be transported in either direction between the exterior phase and the interior of the crystalline zeolite.

In their hydrated form, the aluminosilicates may be represented by the formula:

$$M_{2/n}O:Al_2O_3:wSiO_2:yH_2O \qquad (I)$$

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be any one or more of a number of positive ions as aforesaid, such ions being discussed in greater detail hereinafter. The parent zeolite is dehydrated to actuate it for use as a catalyst. Although the proportions of inorganic oxides in the silicates and their spatial arrangement may vary, effecting distinct properties in the aluminosilicates, the main characteristic of these materials is their ability to undergo dehydration without substantially affecting the $SiO_4$ and $AlO_4$ framework. In this respect, this characteristic is essential for obtaining catalyst compositions of high activity in accordance with the invention.

Representative materials include a synthetic faujasite, designated Zeolite X, which can be represented in terms of mole ratios of oxides as follows:

$$1.0 \pm 0.2 M_{2/n}O:Al_2O_3:2.5 \pm 0.5 SiO_2:yH_2O \qquad (II)$$

wherein M is a metal cation having a valence of not more than three, $n$ represents the valence of M, and $y$ is a value up to eight depending on the identity of M and degree of hydration of the crystal. The sodium form may be represented in terms of mole ratios of oxides as follows:

$$0.9Na_2O:Al_2O_3:2.5SiO_2:6.1H_2O \qquad (III)$$

Another synthesized crystalline aluminosilicate, designated Zeolite A, can be represented in mole ratios of oxides as:

$$1.0 \pm 0.2 M_{2/n}O:Al_2O_3:1.85 \pm 0.5 SiO_2:yH_2O \qquad (IV)$$

wherein M represents a metal cation, $n$ is the valence of M, and $y$ is any value up to about 6. As usually prepared, Zeolite A contains primarily sodium cations and is designated sodium Zeolite A.

Other suitable synthesized crystalline aluminosilicates are those designated Zeolite Y, L, T and D.

The formula for Zeolite Y (which is a synthetic faujasite) expressed in oxide mole ratios is:

$$0.9 \pm 0.2 Na_2O:Al_2O_3:wSiO_2:yH_2O \qquad (V)$$

wherein $w$ is a value ranging from 3 to 6 and $y$ may be any value up to about 9.

The composition of Zeolite L in oxide mole ratios may be represented as:

$$1.0 \pm 0.1 M_{2/n}O:Al_2O_3:6.4 \pm 0.5 SiO_2:yH_2O \qquad (VI)$$

wherein M designates a metal cation, $n$ represents the valence of M, and $y$ is any value from 0 to 7.

The formula for Zeolite D, in terms of oxide mole ratios, may be represented as:

$$0.9 \pm 0.2[xNa_2O:(1-x)K_2O]:Al_2O_3:wSiO_2:yH_2O \qquad (VII)$$

wherein $x$ is a value of 0 to 1, $w$ is from 4.5 to about 4.9 and $y$, in the fully hydrated form, is about 7.

The formula for Zeolite T in terms of oxide mole ratios may be written as:

$$1.1 \pm 0.4 xNa_2O:(1-x)K_2O:Al_2O_3:6.9 \pm 0.5 SiO_2:yH_2O \qquad (VIII)$$

wherein $x$ is any value from about 0.1 to about 0.8 and $y$ is any value from about 0 to about 8.

Other synthesized crystalline aluminosilicates include those designated as ZK-4 and ZK-5.

ZK-4 can be represented in terms of mole ratios of oxides as:

$$0.1 \text{ to } 0.3R:0.7 \text{ to } 1.0M_{2/n}O:Al_2O_3:2.5 \text{ to } 4.0SiO_2:yH_2O \qquad (IX)$$

wherein R is a member selected from the group consisting of methylammonium oxide, hydrogen oxide and mixtures thereof with one another, M is a metal cation, $n$ is the valence of the cation, and $y$ is any value from about 3.5 to about 5.5. As usually synthesized, Zeolite ZK-4 contains primarily sodium cations and can be represented by unit cell formula:

$$7.5 \pm 2Na:2 \pm 0.5H:9 \pm 2AlO_2:15 \pm 2SiO_2 \qquad (X)$$

The major lines of the X-ray diffraction pattern of ZK-4 are set forth in Table 1 below:

TABLE 1

| d Value of reflection in A.: | 100 $I/I_0$ |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK-4 can be prepared by preparing an aqueous solution of oxides containing $Na_2O$, $Al_2O_3$, $SiO_2$, $H_2O$ and tetramethyl-ammonium ion having a composition, in terms of oxide mole ratios, which falls within the following ranges:

$SiO_2/Al_2O_3$ ---------------------------------- 2.5 to 11

$\dfrac{Na_2O}{Na_2O + [(CH_3)_4N]_2O}$ ---------------- 0.5 to 2.5

$\dfrac{Na_2O + [(CH_3)_4N]_2O}{SiO_2}$ ---------------- 1 to 2

$\dfrac{H_2O}{Na_2O + [(CH_3)_4N]_2O}$ ---------------- 25 to 50 maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK-5 is representative of another crystalline aluminosilicate which is prepared in the same manner as Zeolite ZK-4 except that N,N'-dimethyltriethylenediammonium hydroxide is used in place of tetramethylammonium hydroxide. ZK-5 may be prepared from an aqueous sodium aluminosilicate mixture having the following composition expressed in terms of oxide mole ratios as:

$$SiO_2/Al_2O_3 \quad\quad\quad\quad\quad\quad\quad\quad\quad 2.5 \text{ to } 11$$

$$\frac{Na_2O}{Na_2O + [(CH_2)_6N_2(CH_3)_2]OH} \quad\quad 0.5 \text{ to } 2.5$$

$$\frac{H_2O}{Na_2O + [(CH_2)_6N_2(CH_3)_2]OH} \quad\quad 25 \text{ to } 50$$

$$\frac{Na_2O + [(CH_2)_6N_2(CH_3)_2]OH}{SiO_2} \quad\quad 1 \text{ to } 2$$

The N,N'-dimethyltriethylenediammonium hydroxide used in preparing ZK-5 can be prepared by methylating 1,4-diazabicyclo-(2.2.2)-octane with methyl iodide or dimethyl sulfate, followed by conversion to the hydroxide by treatment with silver oxide or barium hydroxide. The reaction may be illustrated as follows:

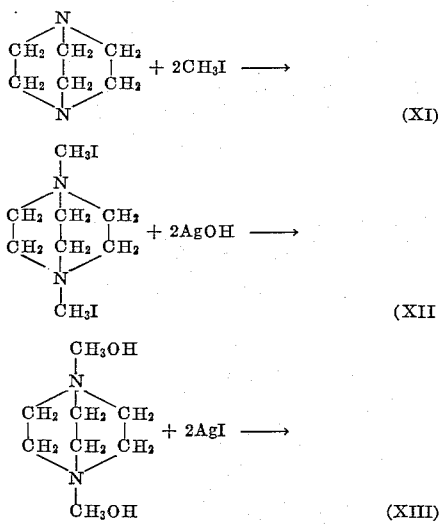

In using the N,N'-dimethyltriethylenediammonium hydroxide compound in the preparation of ZK-5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Quite obviously, the above-listed molecular sieves are only representative of the synthetic crystalline aluminosilicate molecular sieve catalysts which may be used in accordance with the process of the present invention, the particular enumeration of such sieves not being intended to be exclusive.

At the present time, two commercially available molecular sieves are those of the "A" series and of the "X" series. A synthetic zeolite known as "Molecular Sieve 4A" is a crystalline sodium aluminosilicate having an effective pore diameter of about 4 Angstroms. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline aluminosilicate salt having an effective pore diameter of about 5 Angstroms and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the inter-atomic structure of this zeolite from that of the "A" crystal mentioned above. As initially prepared and before activation by dehydration, the 13X material contains water and has the unit cell formula $$Na_{86}[(AlO_2)_{86}(SiO_2)_{106}] \cdot 27H_2O$$

The synthetic zeolite known as "Molecular Sieve 10X" is a crystalline aluminosilicate salt in which a substantial proportion of the sodium ions of the 13X material have been replaced by calcium.

Among the naturally occurring crystalline aluminosilicates which can be employed for purposes of the invention, the preferred aluminosilicates are those which sorb hydrocarbons above $C_3$. Exemplary of such aluminosilicates are faujasite, heulandite, clinoptilolite, dachiardite, and aluminosilicates represented as follows:

Chabazite—$Na_2O.Al_2O_3.4SiO_2.6H_2O$
Gmelinite—$Na_2O.Al_2O_3.4SiO_2.6H_2O$
Mordenite—$Na_2O.Al_2O_3.10SiO_2.6.6H_2O$ Other aluminosilicates which can be used are those resulting from caustic treatment of various clays.

Of the clay materials, montmorillonite and kaolin families are representative types which include the sub-bentonites, such as bentonite, and the kaolins commonly identified as Dixie, McNamee, Georgia and Florida clays in which the main mineral constituent is halloysite, kaolinite, dickite, nacrite or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

$Na_2O$/clay (dry basis) _____ 1.0–6.6 to 1
$SiO_2$/clay (dry basis) _____ 0.01–3.7 to 1
$H_2O/Na_2O$ (mole ratio) _____ 35–180 to 1

Molecular sieves are ordinarily prepared initially in the sodium form of the crystal. The sodium ions in such form may, as desired, be exchanged for other cations, as will be described in greater detail below. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12. After activating by heating until dehydration is attained, the substance is ready for use.

For example, in the preparation of sodium zeolite "A," suitable reagents for the source of silica include silica sol, silica gel, silicic acid or sodium silicate. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 0.5 to 2.5, $Na_2O/SiO_2$ of 0.8 to 3.0 and $H_2O/Na_2O$ of 35 to 200. A convenient and generally employed process of preparation involves preparing an aqueous solution of sodium aluminate and sodium hydroxide and then adding with stirring an aqueous solution of sodium silicate.

The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with salt-free water, while on the filter, until the wash water, in equilibrium with the zeolite, reaches a pH of 9 to 12. The crystals are then dried at a temperature between 25° C. and 150° C. Activation is attained upon dehydration, as for example at 350° C. and 1 mm. pressure or at 350° C. in a stream of dry air.

It is to be noted that the material first formed on mixing the reactants is an amorphous precipitate which is, generally speaking, not catalytically active in the process of the invention. It is only after transformation of the amorphous precipitate to crystalline form that the highly active catalyst described herein is obtained.

Molecular sieves of the other series may be prepared in a similar manner, the composition of the reaction mixture being varied to obtain the desired ratios of ingredients for the particular sieve in question.

The molecular sieve catalysts useable in the process of the present invention may be in the sodium form as aforesaid or may contain other cations, including other metallic cations and/or hydrogen. In preparing the non-sodium forms of the catalyst composition, the aluminosilicate can be contacted with a non-aqueous or aqueous fluid medium comprising a gas, polar solvent or water solution containing the desired positive ion. Where the aluminosilicate is to contain metal cations, the metal cations may be introduced by means of a salt soluble in the fluid medium. When the aluminosilicate is to contain hydrogen ions, such hydrogen ions may be introduced by means of a hydrogen ion-containing fluid medium or a fluid medium containing ammonium ions capable of conversion to hydrogen ions.

In those cases in which the aluminosilicate is to contain both metal cations and hydrogen ions, the aluminosilicate may be treated with a fluid medium containing both the metal salt and hydrogen ions or ammonium ions capable of conversion to hydrogen ions. Alternatively, the aluminosilicate can be first contacted with a fluid medium containing a hydrogen ion or ammonium ion capable of conversion to a hydrogen ion and then with a fluid medium containing at least one metallic salt. Similarly, the aluminosilicate can be first contacted with a fluid medium containing at least one metallic salt and then with a fluid medium containing a hydrogen ion or an ion capable of conversion to a hydrogen ion or a mixture of both.

Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion, metal cation or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation, ammonium ion, or a mixture thereof, equivalent to a pH value ranging from less than 1.0 up to a pH value of about 10.0. Within these limits, pH values for fluid media containing a metallic cation and/or an ammonium ion range from 4.0 to 10.0, and are preferably between a pH value of 4.5 to 8.5. For fluid media containing a hydrogen ion alone or with a metallic cation, the pH values range from less than 1.0 up to about 7.0 and are preferably within the range of less than 3.0 up to 6.0. Where the molar ratio of the aluminosilicate is greater than about 3.0 and less than about 5.0, the pH value for the fluid media containing a hydrogen ion or a metal cation ranges from 3.8 to 8.5. Where ammonium ions are employed, either alone or in combination with metallic cations, the pH value ranges from 4.9 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion. Thus, depending upon the silica to alumina ratio, the pH value varies within rather wide limits.

In carrying out the treatment with the fluid medium, the procedure employed comprises contacting the aluminosilicate with the desired fluid medium or media until such time as metallic cations originally present in the aluminosilicate are removed to the desired extent. Repeated use of fresh solutions of the entering ion is of value to secure more complete exchange. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities. The aluminosilicate is then dried and dehydrated.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid ($NH(SO_3H)_2$), chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$)

hydroxylamine disulfonic acid [$(HSO_3)_2NOH$], nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho, meta and para-methyl, hydroxy, chloro, bromo and nitrosubstituted benzoic acids, phenylacetic acid, mandelic acid, benzylic acid, hippuric acid, benzenesulfonic acid, toluenesulfonic acid, methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the alumino-silicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include complex ammonium compounds such as tetramethylammonium hydroxide, trimethylammonium chloride. Other compounds which can be employed are nitrogen bases such as the salts of guanidine, pyridine, quinoline, etc.

A wide variety of metallic compounds can be employed with facility as a source of metallic cations and include both inorganic and organic salts of the metals of Groups I through VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used. The preferred salts are the chlorides, nitrates, acetates and sulfates.

Rare earth salts may be advantageously employed. Such salts can either be the salt of a single metal or, preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition: cerium (as $CeO_2$) 48% by weight; lanthanum (as $La_2O_3$) 24% by weight; praseodymium (as $Pr_6O_{11}$) 5% by weight; neodymium (as $Nd_2O_3$) 17% by weight; samarium (as $Sm_2O_3$) 3% by weight; gadolinium (as $Gd_2O_3$) 2% by weight; yttrium (as $Y_2O_3$) 0.2% by weight; and other rare earth oxides 0.8% by weight. Didymium chloride is also a mixture of rare earth chlorides, but having a low cerium content. It consists of the following rare earths determined as oxides: lanthanum, 45-46% by weight; cerium, 1-2% by weight; praseodymium, 9-10% by weight; neodymium, 32-33% by weight; samarium, 5-6% by weight; gadolinium, 3-4% by weight; yttrium, 0.4% by weight; other rare earths, 1-2% by weight. It is to be understood that other mixtures of rare earths are equally applicable in the instant invention.

Representative metal salts which can be employed, aside from the mixture mentioned above, include silver chloride, silver sulfate, silver nitrate, silver acetate, silver arsinate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, manganese chloride, manganese sulfate, manganese acetate, manganese carbonate, manganese formate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, selenium chloride, selenium bromide, tellurium chloride, tellurium bromide, etc.

The aluminosilicate catalysts useable in connection with the process of the present invention may be used in powdered, granular or molded state formed into spheres or pellets of finely divided particules having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The aluminosilicate catalysts prepared in the foregoing manner may be used as catalysts per set or as intermediates in the preparation of further modified contact masses consisting of inert and/or catalytically active materials which otherwise serve as a base, support, carrier, binder, matrix or promoter for the aluminosilicate. One embodiment of the invention is the use of the finely divided aluminosilicate catalyst particles in a siliceous gel matrix wherein the catalyst is present in such proportions that the resulting product contains about 2 to 95% by weight, preferably about 5 to 50% by weight, of the aluminosilicate in the final composite.

The aluminosilicate-siliceous gel compositions can be prepared by several methods wherein the aluminosilicate is combined with silica while the latter is in a hydrous state such as in the form of a hydrosol, hydrogel, wet gelatinous precipitate or a mixture thereof. Thus, silica gel formed by hydrolyzing a basic solution of alkali metal silicate with an acid such as hydrochloric, sulfuric, etc., can be mixed directly with finely divided aluminosilicate having a particle size less than 40 microns, preferably within the range of 2 to 7 microns. The mixing of the two components can be accomplished in any desired manner, such as in a ball mill or other types of kneading mills. Similarly, the aluminosilicate may be dispersed in a hydrosol obtained by reacting an alkali metal silicate with an acid or an alkaline coagulent. The hydrosol is then permitted to set in mass to a hydrogel which is thereafter dried and broken into pieces of desired shape, or dispersed through a nozzle into a bath of oil or other water-immiscible suspending medium to obtain spheroidally shaped "bead" particles of catalyst. The aluminosilicate siliceous gel thus obtained is washed free of soluble salts and thereafter dried and/or calcined as desired.

The siliceous gel matrix may also consist of a plural gel comprising a predominant amount of silica with one or more metals or oxides thereof. The preparation of plural gels is well known and generally involves either separate precipitation or coprecipitation techniques in which a suitable salt of the metal oxide is added to an alkali metal silicate and an acid or base, as required, is added to precipitate the corresponding oxides. The silica content of the siliceous gel matrix contemplated herein is generally within the range of 55 to 100 weight percent with the metal oxide content ranging from zero to 45 percent. Minor amounts of promoters or other materials which may be present in the composition include cerium, chromium, cobalt, tungsten, uranium, platinum, lead, zinc, calcium, magnesium, lithium, silver, nickel and their compounds.

The aluminosilicate catalyst may also be incorporated in an alumina gel matrix conveniently prepared by adding ammonium hydroxide, ammonium carbonate, etc. to a salt of aluminum, such as aluminum chloride, aluminum sulfate, aluminum nitrate, etc., in an amount to form aluminum hydroxide, which, upon drying, is converted to alumina. The aluminosilicate catalyst can be mixed with the dried alumina or combined while the alumina is in the form of a hydrosol, hydrogel or wet gelatinous precipitate.

While the crystalline aluminosilicates described above are, within the spirit of the present invention, generally useful for catalyzing hydride-transfer reactions, particularly effective results are obtained through the use of such materials as catalysts in Cannizzaro and/or Tishchenko-type reactions. As will be illustrated in greater detail in the ensuing examples, particular reactions of significance are the conversion of formaldehyde to dimethyl ether and of benzaldehyde to form benzene and toluene. Still other hydride-transfer reactions may appropriately be catalyzed within the confines of the present invention, such as is illustrated in Examples 3 and 5, in which the starting materials are other than aldehydes alone.

The conditions under which the reactions of the present invention may be carried out will necessarily vary depending upon the starting materials, though it may generally be stated that the temperatures which will ordinarily be employed will range between about 100–500° C. with atmospheric pressure being preferable for a commercially practicable process. The starting materials are preferably in vapor form. As has previously been indicated, it is preferable to select a crystalline aluminosilicate having a pore diameter sufficiently large to permit entry therein of the reactants and egress therefrom of the desired products of the reaction. Crystalline aluminosilicates having pore diameters of 5 to 15 A. are preferred, a particularly advantageous catalyst for most purposes being "Molecular Sieve 13X."

The following are illustrative examples of the process of the present invention:

*Example 1*

A stream of dry nitrogen was passed through a trap cooled to −80° C. which contained dry liquid formaldehyde. The effluent contained approximately 8% of formaldehyde. This stream was passed into a heated zone containing 10 ml. of Linde 13X molecular sieve. The catalyst zone was heated and the product analyzed by gas chromatography using a 3.5 foot column packed with silicone oil on firebrick. Table I gives the figures obtained.

TABLE I

| Run No. | Temp., °C. | Percent $CH_2O$ | Percent Dimethyl Ether | Percent $N_2+CO+CO_2$ |
|---|---|---|---|---|
| 1 | 360 | 1.0 | 2.0 | 95 |
| 2 | 393 | 0.8 | 1.7 | 97.5 |
| 3 | 343 | | 0.4 | 99.6 |
| 4 | 310 | 0.3 | 2.5 | 97 |
| 5 | 299 | 0.2 | 8.5 | 91 |
| Blank on feed | | 8.0 | | 92 |

As will be seen from the above data, the process of the present invention makes possible the direct conversion of formaldehyde into dimethyl ether, the latter being of particular value in the separation of boron isotopes, as a refrigerant, as a complexing agent for aluminum chloride

13 to form a catalyst valuable in olefin alkylation, etc. No other means is known of producing dimethyl ether directly from formaldehyde.

*Example 2*

Dry paraformaldehyde was heated at 111° C. and a stream of 0.2 cu. ft. of nitrogen/hour was passed over it. This stream was led into a reactor at 303° C. which contained 5 grams of Linde 13X molecular sieve. The stream was found by analysis to contain 7% formaldehyde. The effluent stream contained 2.8% dimethyl ether. The theoretical yield for the equation $$4CH_2O \rightarrow CH_3OCH_3 + 2CO + H_2O$$

is 2.7%.

*Example 3*

Methyl formate was vaporized at 24° C. in 0.2 cu. ft. of nitrogen/hour and led into a heated bed containing 10 g. of 13X molecular sieve. At temperatures of about 300° C., dimethyl ether was produced as was also carbon monoxide.

While the starting material of this example was an ester rather than an aldehyde as in Examples 1 and 2, the example nevertheless illustrates hydride-transfer and that the reaction is catalyzed by the crystalline alumino-silicate catalyst. In essence, this example involves the establishment of an equilibrium condition as follows:

$$HCOOCH_3 + H_2O \rightleftharpoons HCOOH + CH_3OH \rightleftharpoons 2HCHO + H_2O$$
$$HCOOH + HCHO \longrightarrow CH_3OH + CO_2$$
$$2CH_3OH \xrightarrow{-H_2O} CH_3OCH_3$$

the $H_2O$ necessary to establish this equilibrium being picked up by the catalyst from the atmosphere. Quite obviously, a similar equilibrium could be established using a mixture of formic acid and methanol as the charge stock, other alkyl formates (i.e., ethyl formate) could be used in lieu of the methyl formate, etc.

*Example 4*

A small columnar Vycor reactor was loaded with 10 g. of sodium zeolite X pellets and the catalyst was heated to 450° C. under nitrogen to activate it. About 10 ml. of freshly distilled benzaldehyde was passed over the catalyst at 450–470° C. at the rate of 0.2 ml./minute. A liquid condensate and gaseous products were collected. Bubbling the gas through barium hydroxide solution resulted in the immediate precipitation of barium carbonate, indicating the presence of carbon dioxide. Vapor phase chromatographic analysis of the liquid and gaseous products showed that carbon monoxide, benzene and toluene were formed. The identities of the benzene and toluene were confirmed by infra-red data. The benzene/toluene ratio was about 2.5/1.

It is postulated that the mechanism involved in the above example involves a Cannizzaro-Tishchenko disproportionation reaction at the outset to form benzyl alcohol and benzoic acid, the benzene being formed through decarboxylation of the benzoic acid and the toluene through further reduction of the benzyl alcohol. This may be represented as follows:

$$2\phi CHO \xrightarrow{H_2O} \phi CH_2OH + \phi COOH \begin{cases} \rightarrow \phi H + CO_2 \end{cases}$$

$$\phi CHO + \phi CH_2OH \longrightarrow \phi CH_3 + \phi COOH \begin{cases} \rightarrow \phi H + CO_2 \end{cases}$$

The benzyl alcohol and benzoic acid are not isolated as such.

This example suggests as a use of the process of the present invention the removal of traces of aromatic aldehydes having a disagreeable odor from the air.

*Example 5*

Using the same apparatus and procedure as in Example 4 above, 12 ml. of an equimolar mixture of benzaldehyde and benzyl alcohol were passed over 10 g. of sodium zeolite X at the rate of 0.2 ml./minute. The temperature was 510° C. Again, carbon monoxide, carbon dioxide, benzene and toluene were produced. The benzene/toluene ratio was 1/2.1.

This example again illustrates that one need not use an aldehyde as the sole starting material to effect the desired hydride-transfer. As will be apparent, this example represents the second of the two equations set forth above in Example 4.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of conducting a hydride transfer reaction between two molecules one of which serves as a hydride donor and the other of which serves as a hydride acceptor, one of said molecules being selected from the group consisting of benzaldehyde and formaldehyde, and the other of said molecules being selected from the group consisting of benzaldehyde, formaldehyde, benzyl alcohol and formic acid, comprising carrying out said reaction between said two molecules at a temperature of about 100–500° C. in the presence of a crystalline aluminosilicate catalyst.

2. A method of conducting a hydride transfer reaction between two molecules one of which serves as a hydride donor and the other of which serves as a hydride acceptor, one of said molecules being selected from the group consisting of benzaldehyde and formaldehyde, and the other of said molecules being selected from the group consisting of benzaldehyde, formaldehyde, benzyl alcohol and formic acid, comprising carrying out said reaction between said hydride donor and hydride acceptor in the presence of a crystalline aluminosilicate, said hydride donor and hydride acceptor being brought into contact with said catalyst in vapor form.

3. A method of conducting a hydride transfer reaction between two formaldehyde molecules, one of said molecules serving as the hydride donor and the other as the hydride acceptor, comprising carrying out said reaction between said molecules in the presence of a crystalline aluminosilicate catalyst at a temperature of about 100 to 500° C.

4. A method of conducting a hydride transfer reaction between two benzaldehyde molecules, one of said molecules serving as the hydride donor and the other as the hydride acceptor, comprising carrying out said reaction between said molecules in the presence of a crystalline aluminosilicate catalyst at a temperature of about 100 to 500° C.

5. A method of carrying out a disproportionation reaction whereby a first molecule of formaldehyde is oxidized and a second molecule of formaldehyde is reduced, comprising bringing said first and second molecules into contact with one another in the presence of a crystalline aluminosilicate catalyst at a temperature of about 100 to 500° C.

6. A method of carrying out disproportionation reaction whereby a first molecule of benzaldehyde is oxidized and a second molecule of benzaldehyde is reduced, comprising bringing said first and second molecules into contact with one another in the presence of a crystalline aluminosilicate catalyst at a temperature of about 100 to 500° C.

7. A process of converting formaldehyde at least partially into dimethyl ether comprising carrying out said conversion in the presence of a crystalline aluminosilicate catalyst at a temperature of about 100 to 500° C.

8. A process as defined in claim 7 wherein said catalyst is a sodium crystalline aluminosilicate catalyst and said conversion takes place at about 300° C.

9. A process of converting benzaldehyde at least partially to benzene and toluene comprising carrying out said conversion in the presence of a crystalline aluminosilicate catalyst at a temperature of about 100 to 500° C.

References Cited by the Examiner
UNITED STATES PATENTS 3,173,855    3/1965    Miale et al.

LEON ZITVER, *Primary Examiner.*
H. T. MARS, *Assistant Examiner.*